Oct. 25, 1966  S. M. SHOBERT  3,281,299
METHOD AND APPARATUS FOR MAKING FIBER REINFORCED
CYLINDRICAL ARTICLES
Filed Dec. 26, 1962  4 Sheets-Sheet 1

INVENTOR.
Samuel M. Shobert,
BY Hood, Gust & Irish
Attorneys.

Oct. 25, 1966 S. M. SHOBERT 3,281,299
METHOD AND APPARATUS FOR MAKING FIBER REINFORCED
CYLINDRICAL ARTICLES
Filed Dec. 26, 1962 4 Sheets-Sheet 2

INVENTOR.
Samuel M. Shobert,
BY Hood, Gust & Irish
Attorneys.

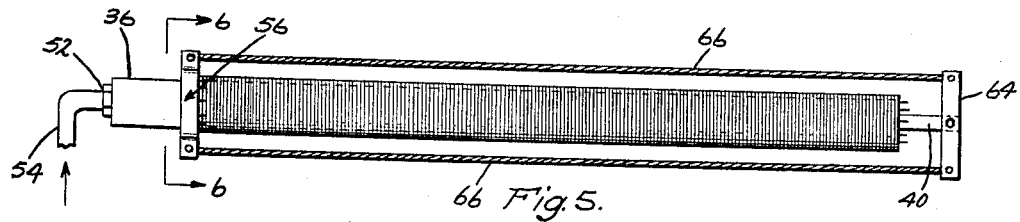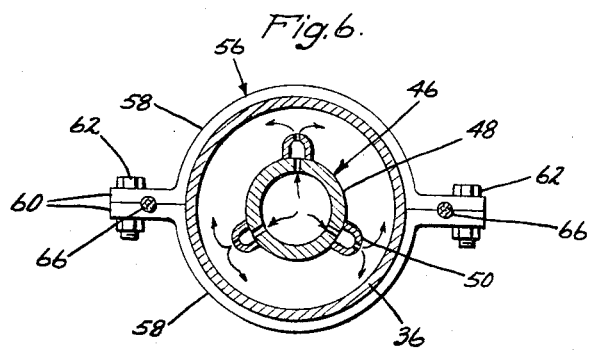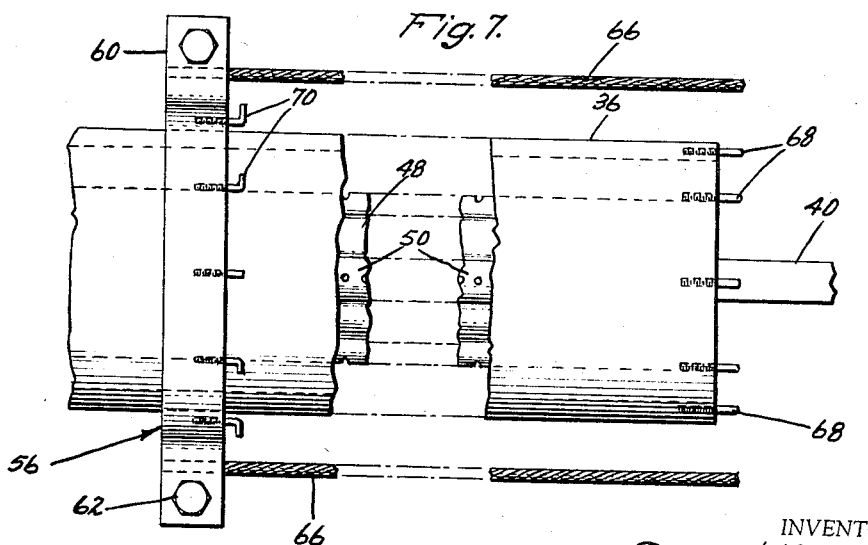

Oct. 25, 1966 S. M. SHOBERT 3,281,299
METHOD AND APPARATUS FOR MAKING FIBER REINFORCED
CYLINDRICAL ARTICLES
Filed Dec. 26, 1962 4 Sheets-Sheet 4

INVENTOR.
Samuel M. Shobert,
BY Hood, Gust & Irish
Attorneys.

United States Patent Office 3,281,299
Patented Oct. 25, 1966

3,281,299
METHOD AND APPARATUS FOR MAKING FIBER REINFORCED CYLINDRICAL ARTICLES
Samuel M. Shobert, 17760 Dragoon Trail, Mishawaka, Ind.
Filed Dec. 26, 1962, Ser. No. 247,146
7 Claims. (Cl. 156—175)

The present invention relates to an apparatus and method for fabricating reinforced plastic pipe, and more particularly to a unique apparatus and method whereby such pipe may be manufactured efficiently and economically with the resulting pipe being of superior quality as to strength and durability.

Glass fiber is conventionally used as reinforcement in epoxy, polyester and other types of resins. At this state of development, plastic articles reinforced with glass fiber are almost as numerous as the articles themselves. The art in certain areas has developed to the point where fabricating efficiencies have become of utmost importance, and much effort and money are being expended in connection with obtaining products of superior quality at less cost. By doing so, these products become competitive with counterpart products of other material already on the market, and in some instances serve as replacements.

Among the aforementioned products are those relating to tubing or pipe wherein resin impregnated glass fibers are wound into an elongated helix with the turns of the helix being adhered together by the resin. In the past, such tubing has been fabricated by winding layer upon layer of helical wrappings of glass thread onto a rotating cylinder, with a liquid resin being applied to the turns of the helices. Once the required number of layers has been wrapped onto the cylinder, the resin is cured. Following curing, the resulting reinforced resin or plastic tube is removed from the cylinder.

Reinforced pipe or tubing made according to known prior art methods and techniques have been found deficient in the respects of strength and durability. One of the primary reasons leading to this deficiency is the discovery that the glass strands or filaments used in the past have been handled in such a way as to weaken the reinforcing fibers before they ever become wound into the finished product. In the known methods of handling the glass material, attrition between the individual fibers or monofilaments have resulted in breaking the same into lengths which are shorter than those originally formed in the fiber-making process, and since these fibers have extremely high tensile strength, it becomes important to maintain all of the fibers and monofilaments in as great lengths as possible in the finished product.

The present invention is important from the standpoint that it contributes to a superior end product by and through the use of novel methods and apparatus.

It is therefore an object of this invention to provide an apparatus and method for fabricating glass fiber reinforced tubing in a more facile, economical and reliable manner.

It is another object of this invention to provide a method wherein glass fiber material is so handled and treated in the manufacture of fiber-reinforced plastic tubing such that the monofilaments which eventually end up in the finished product are of maximum length and strength.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

FIG. 5 is a top plan view of only the mandrel portion of the apparatus of FIG. 3;

FIG. 6 is a cross-sectional illustration taken substantially along section line 6—6 of FIG. 5;

FIG. 7 is a fragmentary side elevation, partially broken away and enlarged for clarity, of the mandrel construction as already shown in FIGS. 3, 4 and 5;

Figure 1:
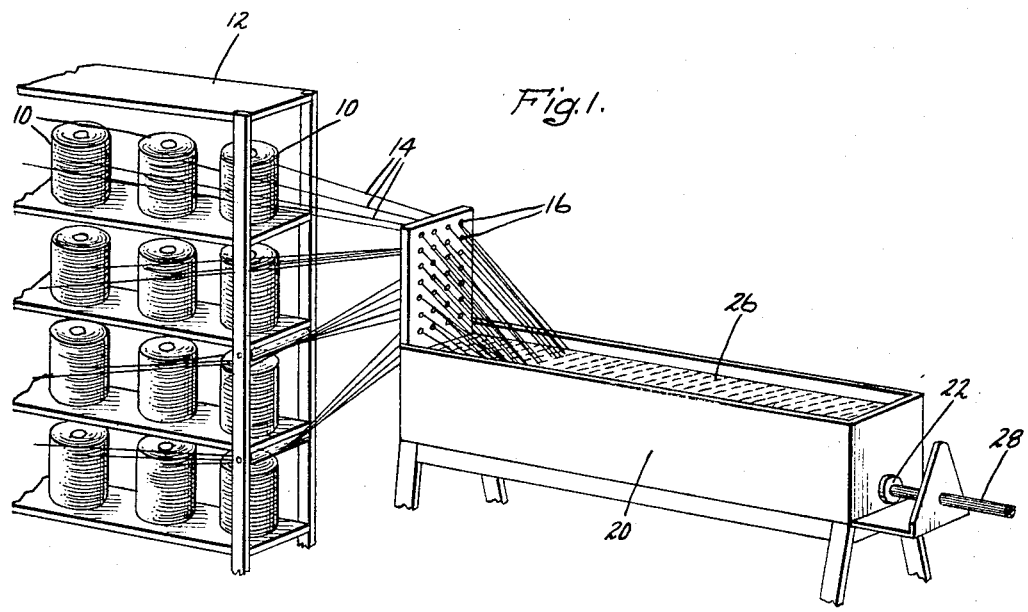
FIG. 1 is a perspective illustration of that portion of an embodiment of this invention wherein the glass fiber material is impregnated with resin and gathered into a bundle of glass filaments, this bundle being used in the fabrication of tubing.
Figure 2:
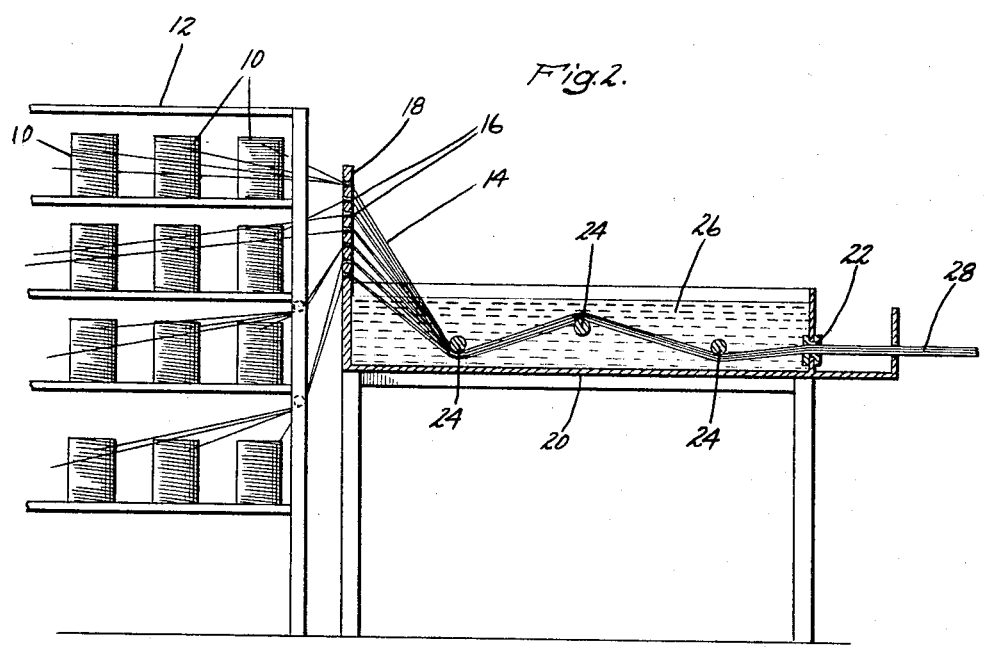
FIG. 2 is a longitudinal sectional illustration of that portion of the apparatus shown in FIG. 1.

Referring to the drawings, and more particularly to FIGS. 1 and 2, the reinforcement used in this invention is in the form of glass fibers of conventional physical and chemical characteristics, such fibers being currently used in many different reinforced plastic articles such as fishing rods, boats and the like. In the manufacture of such fibers, it is conventional to produce glass monofilaments of substantial length by a centrifuging or spinning apparatus. In the usual case, this spinning apparatus is provided with a plurality of centrifuging apertures having platinum bushings, a monofilament being centrifuged from each of these bushings. Further, in the usual case, there are two hundred and four (204) apertures in a single spinning head such that the strand-like product which issues from the spinner is in the form of a thread or the like made up of 204 basic filaments of glass. This particular thread is called an "end", a single "end" having 204 basic filaments. Hereinafter, the term "single end" will be used to denote such a basically fabricated filament or thread; however, it will be readily understood by those persons skilled in the art that the number of basic filaments in the "end" may vary without departing from the scope of this invention.

Of importance with respect to this invention is the fact that when the individual monofilaments issue from the spinner, they are of considerable length. When there are a plurality of these filaments issuing from the spinner, they are compacted or assembled together in a relatively tiny "end" which is wound into what is called a "cake". This "cake" may be considered as resembling an ordinary spool of thread with the spool removed.

The "cake" thereupon serves as the package from which a user may dispense the "end". In any event, it is of importance in this invention to recognize that the "ends" or threads in the "cakes" are as close to the raw product which emerges from the spinner as possible, and that in this "cake" form, the monofilaments are of maximum length.

It has also been found that when these "ends" are twisted or are assembled with the other "ends" and twisted or otherwise rubbed together, the attrition will break the monofilaments into shorter lengths. In finally finished products wherein these broken filaments serve as reinforcements, the strength of the finished product is much less than it otherwise would be if the filaments were not broken. It is therefore important in the present invention that the methods and techniques utilized produce a minimum of breakage in the filaments so as to provide maximum strength in the finished product.

Referring to FIGS. 1 and 2, "cakes" of glass "ends" are identified by the numeral 10, there being a plurality of these "cakes" supported by a suitable creel 12. The "ends" are wound in a helix in these cakes and may be payed therefrom by merely being withdrawn. As shown in FIG. 1, a plurality of the cakes 10 have the ends 14 drawn therefrom and passed through companion apertures 16 in a guide plate 18, this plate 18 being mounted on the rear end of a suitable elongated vessel 20 having an apertured gathering die 22 in the distal end thereof. Transverse of the vessel or tank 20 are a series of smooth, horizontal steel rods 24 which are kept continuously submerged in resin maintained at a level as indicated by the reference numeral 26 in FIG. 2.

The apertures 16 in the distribution plate 18 are spaced apart both horizontally and vertically as shown. The "ends" 14 after being passed through the apertures 16 are guided under and over the respective transverse bars 24 as shown and are also passed through the aperture of the gathering die 22. Just enough "ends" 14 are used such that the bundle of "ends," as indicated by the numeral 28, which emerges from the die 22 is thoroughly impregnated with resin without any air voids being entrapped. If too much glass, or in other words too many "ends," are passed through the die 22, the resulting bundle will be starved for resin, whereupon it will draw in air and thereby create voids or fractures in the finished product. This produces a weakness which should be avoided. If this condition should develop, the total number of "ends" should be reduced until the condition disappears. If too few "ends" are used, an excess of resin will be entrained in the bundle, and this resin will drop therefrom. Thus, the ratio of "ends" to resin should be set to fall between these two extremes.

As is shown more clearly in FIG. 2, as the individual ends 14 enter the bath 26 of resin, they are not in contact with any other "ends." Thus, these "ends" become thoroughly wetted with resin before they arrive at the first transverse guide bar 24. Upon arriving at this bar 24, the "ends" will be transversely spaced to a degree corresponding to the horizontal spacing of the apertures 16 in the distribution plate 18, those "ends" which are vertically aligned by reason of the vertical arrangement of the apertures 16 becoming bunched together. The important point to note is that before the individual "ends" 14 become bunched together or placed into contact with one another, they are first wetted with the resin 26. It will be appreciated that this resin may be of the conventional epoxy or polyester type which hardens upon curing.

The "ends" 14 are passed over the middle bar 24 and under the right-hand bar 24 prior to being passed through the sizing die 22. Thus, the "ends" become thoroughly wetted by passing through the resin 26 in the tank 20 prior to the time they are assembled into the bundle 28. Preferably, the aperture in the gathering die 22 is round such that the shape of the bundle 28 as it emerges from the die is cylindrical.

By way of explaining the importance of the apparatus described thus far, if everything remained the same except the resin 26 were eliminated, this would mean that the "ends" 14 would be assembled together into the bundle 28 in dry condition. It has been found that the monofilaments in the "ends" are their own worst enemy, meaning that attrition between the dry filaments results in breakage thereof. However, it has been discovered that by wetting these monofilaments and "ends" prior to the time of assembling the same together, the resin acts as a lubricant and thereby reduces breakage to a minimum. Thus, the filamentary material contained in the bundle 28 as it emerges from the die 22 is of maximum length, hence strength.

Now turning to FIGS. 3 through 7, the second portion of the apparatus of this invention will be described. With particuar reference to FIG. 3, the machine there illustrated closely resembles a lathe and comprises a frame 30 having a rotatable chuck 32 mounted thereon. A housing 34 contains the usual drive motor and gearing.

An elongated, hollow, cylindrical mandrel 36 is clamped into the chuck 32 for rotation about its axis. This axis is horizontally arranged. While this mounting of the mandrel 36 is cantilever in nature, still it is preferred to provide a tail stock member 38 which is operatively engaged with a shaft segment 40 which in turn is attached to the right-hand end of the mandrel 36. This attachment includes a bearing member 42 (FIG. 4) which is attached to a spider 44 which in turn is secured to the interior of mandrel 36. The mandrel 36 is thereupon capable of rotating about its horizontal axis and is rigidly supported at both ends.

Figure 4:
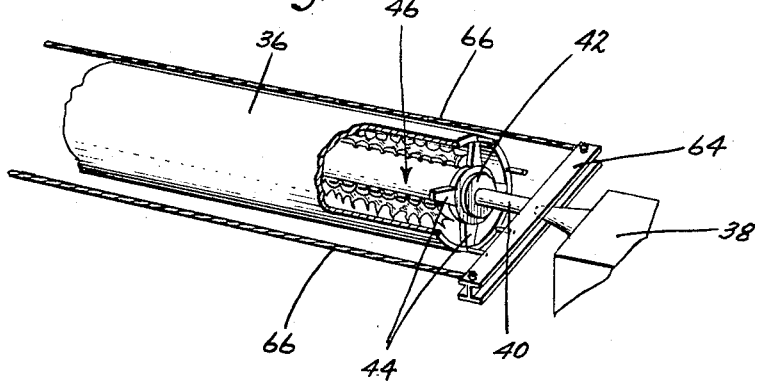
FIG. 4 is an enlarged fragmentary view partly broken away and sectioned for clarity of one portion of the apparatus of FIG. 3.

Mounted inside of the mandrel 36 for rotation therewith is a heater which, in FIG. 4, is indicated generally by the numeral 46. This heater is attached at its right-hand end to the spider 44 and to its left-hand end to a similar spider (not shown). This heater 46 is in reality a gas burner having conventionally sized orifices axially spaced therealong, the size and shape of the burner being such as to heat uniformly the mandrel 36 between the ends thereof. As shown more clearly in FIG. 6, the heater is composed of a central or coaxial conduit 48 having circumferentially spaced nozzle members 50 thereon, these nozzle members being apertured to provide gas burners.

At the left-hand end of the mandrel 36, as shown more clearly in FIG. 5, a swivel-type seal 52 connects the rotatable pipe 48 to a stationary, inlet conduit 54. The purpose of the fitting 52 is merely to provide a gas-tight seal between the non-rotatable inlet 54 and the rotatable pipe 48.

Detachably mounted on the left-hand end of the mandrel 36, adjacent the chuck 32, is a collar 56 which is made up of two semicircular bands 58. These bands 58 have diametrically extending flanges 60 which are secured together by means of suitable bolts 62, which bolts when completely tightened serve to clamp the two bands 58 against movement onto the mandrel 36. When these bolts 62 are slightly loosened, the collar 56 is free to rotate or slide on the mandrel 36.

A pull-bar 64 may be mounted on the shaft extension 40 in such a manner that the latter is free to rotate therein. This bar 64 is strong and rigid and extends diametrically across the righthand end of the mandrel 36. Two cables 66 are fastened to the opposite ends of the bar 64 and extend alongside in parallelism the mandrel 36 as shown more clearly in FIG. 5. The other ends of these cables 66 are fastened to diametrically opposite points on the collar 56, and in one embodiment of this invention are clamped between the two flanges 60 by means of the bolts 62. The attachment of these cable ends to the collar 56 is such as to permit easy disconnection for purposes which will become apparent from the following description.

Axially extending from the right-hand end of the mandrel 36 are a plurality of circumferentially spaced pins 68. A convenient way of attaching these pins to the mandrel is by threading the pins themselves and screwing them into companion, threaded bores in the mandrel. As is shown more clearly in FIG. 7, these pins 68 lie radially within the outer periphery of the mandrel 36.

A similar set of pins 70 which are circumferentially spaced apart are attached to the collar 56 as shown in FIG. 7. These pins 70 are located as closely to the periphery of the mandrel 36 as possible for a purpose which will become apparent from the following description. Desirably, the pins 70 and 68 are equal in number and in circumferential spacing such that they may be regarded as being in axially opposite pairs.

Referring once again to FIG. 3, a conventional traversing or lead screw 72 is rotatably mounted on the frame 30 and has driving connections with the mechanism inside the housing 34 which rotates the mandrel 36. Conventionally, the traversing screw 72 is rotated at a predetermined rate with respect to the mandrel 36.

Mounted on the bed of the frame 30 is a carriage 74 having a driving connection with the traversing screw 72. This carriage carries an apertured guide member 76 for a purpose which will be explained more fully hereinafter. The carriage 74 is capable of being traversed between the opposite ends of the mandrel 36 in a continual, reversing operation. In other words, the carriage 74 can move from the left-hand end to the right-hand end and then be reversed to move in the opposite direction to the left-hand end. A suitable reversing type electric motor inside the housing 34 can serve the purpose of reversing the rotation of the lead screw 72 at the critical times for moving the carriage 74 oppositely.

Figure 3:
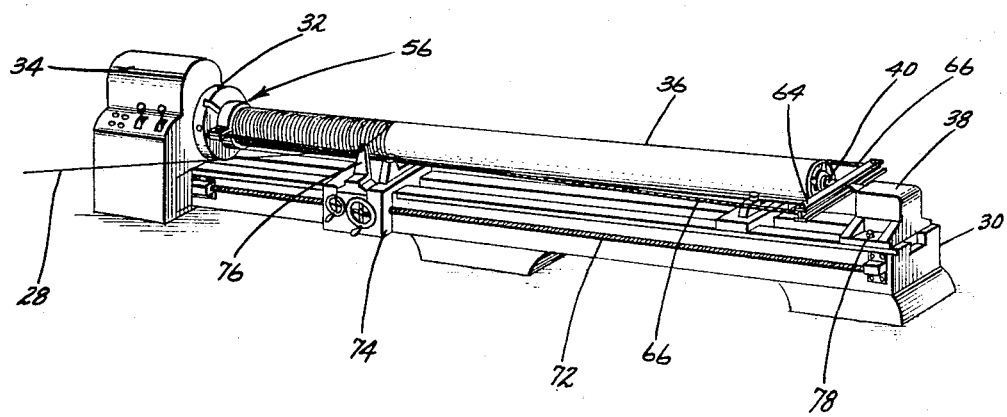
FIG. 3 is a perspective illustration of a second portion of this invention whereby the bundle which emanates from the apparatus shown in FIGS. 1 and 2 may be applied to a rotating mandrel for forming a cylindrical article.

In operation, the collar 56 is initially, tightly clamped onto the left-hand end of the hollow mandrel 36. The tail-stock member 38 is positioned to support the right-hand of the mandrel 30. The carriage 74 is moved to a position adjacent the collar 56 and the cables 66 are disconnected from the collar 56. The resin-wetted bundle 28 from the apparatus of FIGS. 1 and 2 is guided through the aperture in the guide member 76 and fastened to the mandrel 36. The machine of FIG. 3 is thereupon set into operation whereupon the bundle 28 is wound onto the mandrel 36 from the left-hand end toward the right-hand end. The pitch of the traversing screw 72 as well as the rotation thereof are so adjusted as to lay the turns of the bundle 28 in contiguity on the mandrel 36 such that when the carriage 74 reaches the right-hand end of the mandrel 36, a single helical layer of glass fiber will be applied thereto.

Once the carriage 74 reaches the right-hand end, the traverse thereof is reversed so as to lay a second helical layer of wetted bundle on top of the first layer. This operation is continued until the carriage 74 reaches the left-hand end.

At this particular moment, the rotation of the mandrel 36 as well as the traversing screw 72 is stopped. The bundle 28 is thereupon drawn through the guide member 76 and hooked over the pins 68 and 70. In other words, the bundle is extended in an axial direction from pin 70 to pin 68, from the latter to an adjacent pin 68, and from there to the axially opposite pin 70, and from the latter to an adjacent pin 70, and then axially to another pin 68 until one strand is extended between each pair of pins. This results in a plurality of circumferentially spaced, axially extending parallel strands being laid on top of the two helical layers of bundle previously applied to the mandrel.

Following this, the mandrel 36 and traversing screw 72 are rotated as before for the purpose of applying two more helical layers of wetted bundle onto the mandrel. This then results in the longitudinal strands between the pins 68 and 70 being sandwiched between two helical layers of wetted bundle.

All during the time the various strands are being applied to the mandrel 36, the latter is being gently heated by means of the gas burner 46. In other words, the latter is operated such that the mandrel 36 is kept warm. Thus, all during the time the resin-wetted bundle 28 is being applied to the mandrel 36, the curing of the resin is taking place such that by the time the wrapping operation is completed, little, if any, additional time is required within which to complete the cure.

Once the cure has been completed, the bundle 28 is severed and the collar 56 is loosened slightly so as to be slidable over the mandrel 36. Also, the two cables 66 are attached to the collar 56.

The tail-stock member 38 is pivoted clockwise about a suitable bolt or pin 78 which passes into the frame 30. The bar 64 is thereupon grasped by either an operator or by a suitable pulling mechanism for drawing the collar 56 toward the right as viewed in FIGS. 3 and 5. The collar 56 engages the adjacent end of the fiber glass cylinder on the mandrel 36 and strips the same from the mandrel in a right-hand direction. Once the cylinder has been removed from the mandrel 36, the collar 56 is returned to its illustrated position adjacent to the chuck 32, the cables 66 are removed, and the collar 56 tightened. The tail-stock member 38 is returned to engagement with the shaft extension 40, whereupon the operation of forming a new cylinder is repeated.

As previously explained, the fibers in the glass bundle 28 which ultimately find their way into the cylinder on the mandrel 36 are of maximum length, hence strength. This is brought about by the fact that all of the apparatus and the method previously described are arranged such that there is minimal attrition between dry fibers which thereupon conduces to minimal breakage, and the filaments or fibers are maximum length. The maximum length fibers in the finished tubing produce maximum bursting and flexural strength.

Figure 8:
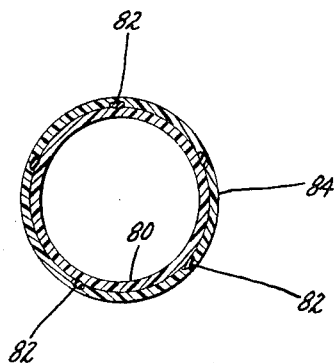
FIG. 8 is a cross-sectional view of a glass fiber reinforced plastic article made in accordance with the apparatus and methods of this invention.
Figure 9:
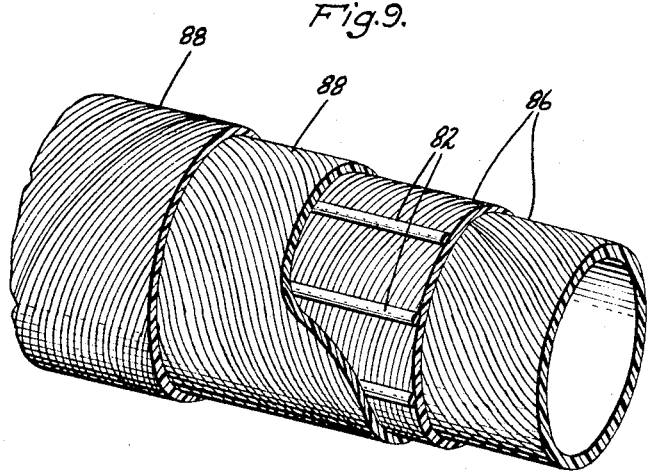
FIG. 9 is a perspective illustration partially sectioned and broken away for clarity of the article of FIG. 8.

As shown in FIGS. 8 and 9, the finished tubing will have the structure there illustrated. As shown in FIG. 8, the inner lamination 80 has superposed thereon a plurality of axially extending strands or bundles 82. On top of these strands 82 as well as the layer 80 is a second layer 84. The input layer 80 is composed of the two helical wrappings 86 of FIG. 9, and the outer layer 84 is composed of the two helical wrappings 88. The longitudinal strands 82 are sandwiched between adjacent wrappings 86 and 88.

It has been discovered that the tubular structure of FIGS. 8 and 9 has superior strength qualities as compared with prior art tubing. It has excellent bursting strength as well as strength in compression. When forces are applied between opposite ends of a segment of the tubing of FIGS. 8 and 9, the strands or bundles 82 tend to buckle transversely. However, by reason of the presense of the inner and outer layers 80 and 84, this buckling is resisted which thereupon results in a transferral of the compressive forces to the layers themselves. Since the layers have excellent tensile strength, that is, strength radially outwardly, it is thus seen that compressive as well as bursting strengths are maximum.

While I have described above the principles of my invention in connection with specific apparatus, it is to be clearly understood that this description is made only by way of example and not as a limitation to the scope of my invention.

What is claimed is:

1. Apparatus for fabricating a cylindrical article of resin impregnated strands comprising a rigid frame having a chuck member mounted thereon for rotation about a substantially horizontal axis, an elongated hollow cylindrically shaped mandrel having opposite end portions, one end portion being secured to said chuck member for rotating said mandrel about the axis thereof, an elongated gas heater coaxially mounted inside said mandrel for rotation therewith, said gas heater having a multiplicity of jet apertures axially and circumferentially spaced apart which serve as burners for heating the length of said mandrel, means for supplying said heater with fuel while said mandrel is rotating whereby the resin of said impregnated strands may be cured, a tail-stock member mounted on said frame in supporting engagement with the other end portion of said mandrel, said tail-stock member having a pivotal connection with said frame whereby said tail-stock member may be alternatively swung into and out of supporting engagement with said mandrel, an annular collar on said mandrel adjacent to said chuck member, said collar having an inner periphery which is contiguous with the outer periphery of said mandrel, said collar being slidable on said mandrel and operable to engage the end of a formed cylindrical article and strip the same from the mandrel, a bar member disposed opposite said mandrel end portion and extending diametrically with respect to said mandrel, said bar member being operatively connected to said mandrel, a pair of cables connected to the opposite ends, respectively, of said bar member and extending alongside said mandrel on diametrically opposite sides thereof, said cables also being connected to said collar on diametrically opposite sides thereof, a traversing screw rotatably mounted on said frame and extending in a direction parallel to said mandrel, a carriage movably mounted on said frame for movement parallel to said mandrel between the end portions thereof, means connecting said carriage to said traversing screw whereby rotation of said traversing screw produces movement of said carriage on said frame, means interconnecting said traversing screw and said mandrel together for simultaneous rotation thereof, a strand guide on said carriage which is movable therewith, a plurality of pins extending axially from the other end portion of said mandrel inside the peripheral extent of the latter, said pins being circumferentially spaced apart, a second plurality of pins on said collar which are circumferentially spaced apart, said second pins having hook portions adapted to receive strands which extend from said other end portion, and means for releasably clamping said collar onto said mandrel for rotation therewith.

2. Apparatus for fabricating a cylindrical article of resin impregnated strands comprising a rigid frame having a chuck member mounted thereon for rotation about a substantially horizontal axis, an elongated hollow cylindrically shaped mandrel having opposite end portions, one end portion being secured to said chuck member for rotating said mandrel about the axis thereof, means internally of said mandrel for heating the same along the entire length thereof between said end portions whereby the resin of said impregnated strands may be cured, a tail-stock member mounted on said frame in supporting engagement with the other end portion of said mandrel, said tail-stock member having a pivotal connection with said frame whereby said tail-stock member may be alternatively swung into and out of supporting engagement with said mandrel, an annular collar on said mandrel adjacent to said chuck member, said collar having an inner periphery which is contiguous with the outer periphery of said mandrel, said collar being slidable on said mandrel and operable to engage the end of a formed cylindrical article and strip the same from the mandrel, a bar member disposed opposite said other mandrel end portion and extending diametrically with respect to said mandrel, said bar member being operatively connected to said mandrel, a pair of cables connected to opposite ends, respectively, of said bar member and extending alongside said mandrel on diametrically opposite sides thereof, said cables also being connected to said collar on diametrically opposite sides thereof, a traversing screw rotatably mounted on said frame and extending in a direction parallel to said mandrel, a carriage movably mounted on said frame for movement parallel to said mandrel between the end portions thereof, means connecting said carriage to said traversing screw whereby rotation of said traversing screw produces movement of said carriage on said frame, means interconnecting said traversing screw and said mandrel together for simultaneous rotation thereof, a strand guide on said carriage which is movable therewith, a plurality of pins extending axially from the other end portion of said mandrel inside the peripheral extent of the latter, said pins being circumferentially spaced apart, a second plurality of pins on said collar which are circumferentially spaced apart, said second pins having hook portions adapted to receive strands which extend from said other end portion, and means for releasably clamping said collar onto said mandrel for rotation therewith.

3. Apparatus for fabricating a cylindrical article of resin impregnated strands comprising a rigid frame having a chuck member mounted thereon for rotation about a substantially horizontal axis, an elongated hollow cylindrically shaped mandrel having opposite end portions, one end portion being secured to said chuck member for rotating said mandrel about the axis thereof, means internally of said mandrel for heating the same along the entire length thereof between said end portions whereby the resin of said impregnated strands may be cured, means for selectively supporting the other end portion of said mandrel, an annular collar on said mandrel adjacent to said chuck member, said collar having an inner periphery which is contiguous with the outer periphery of said mandrel and operable to engage the end of a formed cylindrical article and strip the same from the mandrel, said collar being slidable on said mandrel, a bar member disposed opposite said other mandrel end portion and extending diametrically with respect to said mandrel, said bar member being operatively connected to said mandrel, a pair of cables connected to the opposite ends, respectively, of said bar member and extending alongside said mandrel on diametrically opposite sides thereof, said cables also being connected to said collar on diametrically opposite sides thereof, a traversing screw rotatably mounted on said frame and extending in a direction parallel to said mandrel, a carriage movably mounted on said frame for movement parallel to said mandrel between the end portions thereof, means connecting said carriage to said traversing screw whereby rotation of said traversing screw produces movement of said carriage on said frame, means interconnecting said traversing screw and said mandrel together for simultaneous rotation thereof, a strand guide on said carriage which is movable therewith, a plurality of pins extending axially from the other end portion of said mandrel inside the peripheral extent of the latter, said pins being circumferentially spaced apart, a second plurality of pins on said collar which are circumferentially spaced apart, said second pins having hook portions adapted to receive strands which extend from said other end portion, and means for releasably clamping said collar onto said mandrel for rotation therewith.

4. Apparatus for fabricating a cylindrical article of resin impregnated strands comprising a rigid frame having a chuck member mounted thereon for rotation about a substantially horizontal axis, an elongated hollow cylindrically shaped mandrel having opposite end portions, one end portion being secured to said chuck member for rotating said mandrel about the axis thereof, means internally of said mandrel for heating the same along the entire length thereof between said end portions whereby the resin of said impregnated strands may be cured, means for selectively supporting the other end portion of said mandrel, an annular collar on said mandrel adjacent to said mandrel, said collar having an inner periphery which is contiguous with the outer periphery of said mandrel, said collar being slidable on said mandrel and operable to engage the end of a formed cylindrical article and strip the same from the mandrel, means for moving said collar axially on said mandrel, a traversing screw rotatably mounted on said frame and extending in a direction parallel to said mandrel, a carriage movably mounted on said frame for movement parallel to said mandrel between the end portions thereof, means connecting said carriage to said traversing screw whereby rotation of said traversing screw produces movement of said carriage on said frame, means interconnecting said traversing screw and said mandrel together for simultaneous rotation thereof, a strand guide on said carriage which is movable therewith, a plurality of pins extending axially from the other end portion of said mandrel inside the peripheral extent of the latter, said pins being circumferentially spaced apart, a second plurality of pins on said collar which are circumferentially spaced apart, said second pins having hook portions adapted to receive strands which extend from said other end portion, and means for releasably clamping said collar onto said mandrel for rotation therewith.

5. Apparatus for fabricating a cylindrical article of resin impregnated strands comprising a rigid frame having a chuck member mounted thereon for rotation about a substantially horizontal axis, an elongated hollow cylindrically shaped mandrel having opposite end portions, one end portion being secured to said chuck member for rotating said mandrel about the axis thereof, means internally of said mandrel for heating the same along the entire length therefor between said end portions whereby the resin of said impregnated strands may be cured, means for selectively supporting the other end portion of said mandrel, an annular collar on said mandrel adjacent to said chuck member, said collor having an inner periphery which is contiguous with the outer periphery of said mandrel, said collar being slidable on said mandrel and operable to engage the end of a formed cylindrical article and strip the same from the mandrel, means for moving said collar axially on said mandrel, means for guiding a strand along the length of said mandrel in response to rotation of the latter for the purpose of winding a helix on said mandrel, a plurality of pins extending axially from the other end portion of said mandrel inside the peripheral extent of the latter, said pins being circumferentially spaced apart, a second plurality of pins on said collar which are circumferentially spaced apart, said second pins having hook portions adapted to receive strands which extend from said other end portion, and means for releasably clamping said collar onto said mandrel for rotation therewith.

6. Apparatus for fabricating a cylindrical article of resin impregnated strands comprising a rigid frame having a chuck member mounted thereon for rotation about a substantially horizontal axis, an elongated hollow cylindrically shaped mandrel having opposite end portions, one end portion being secured to said chuck member for rotating said mandrel about the axis thereof, means internally of said mandrel for heating the same along the entire length thereof between said end portions whereby the resin of said impregnated strands may be cured, means for selectively supporting the other end portion of said mandrel, an annular collar on said mandrel adjacent to said chuck member, said collar having an inner periphery which is contiguous with the outer periphery of said mandrel, said collar being slidable on said mandrel and operable to engage the end of a formed cylindrical article and strip the same from the mandrel, means for moving said collar axially on said mandrel, means for guiding a strand along the length of said mandrel in response to rotation of the latter for the purpose of winding a helix on said mandrel, means for holding a plurality of axially extending circumferentially spaced strands on said mandrel for rotation therewith, and means for releasably clamping said collar onto said mandrel for rotation therewith.

7. The method of fabricating a cylindrical article comprising the steps in sequence of (a) wetting a multiplicity of glass-fiber filament with a liquid heat-hardenable resin. (b) collecting said wetted filaments together into an elongated bundle, (c) driving said wetted bundle onto a rotating mandrel, (d) winding said wetted bundle to form a helical layer onto said mandrel as the latter rotates, (e) stopping the rotation of said mandrel, (f) continuing to draw said wetted bundle and disposing same into a plurality of circumferentially spaced and axially extending winding another helical layer of said wetted bundle layer, (g) resuming the rotation of the mandrel and winding another helical layer of said wetted bundle about said axially extending wetted strands and (h) curing the assembled layers of wetted strands.

References Cited by the Examiner
UNITED STATES PATENTS

| | | | |
|---|---|---|---|
| 2,747,616 | 5/1956 | De Ganahl | 156—175 |
| 2,862,547 | 12/1958 | Brink | 156—180 |
| 2,980,158 | 4/1961 | Meyer | 156—433 X |
| 3,023,135 | 2/1962 | Wiltshire | 156—173 |
| 3,031,361 | 4/1962 | Strickland | 156—175 X |
| 3,034,566 | 5/1962 | McKay | 156—180 |
| 3,112,234 | 11/1963 | Krupp | 156—175 X |

EARL M. BERGERT, *Primary Examiner.*

R. J. CARLSON, P. DIER, *Assistant Examiners.*